United States Patent [19]

Cole et al.

[11] Patent Number: 4,974,306

[45] Date of Patent: Dec. 4, 1990

[54] CROSSCUT FIXTURE FOR TABLE SAW

[75] Inventors: Jerry W. Cole, 7 Dolge Ct., Charlton, Mass. 01507; L. Andrew Valk, Worcester, Mass.

[73] Assignee: Jerry W. Cole, Charlton, Mass.

[21] Appl. No.: 342,488

[22] Filed: Apr. 24, 1989

Related U.S. Application Data

[63] Continuation of Ser. No. 64,311, Jun. 18, 1987, abandoned.

[51] Int. Cl.[5] .......................... B27B 27/08; B23Q 3/02

[52] U.S. Cl. ..................................... 29/434; 83/435.1; 83/468; 83/468.2; 83/477.2

[58] Field of Search ....................... 83/435.1, 437, 438, 83/446, 447, 477, 477.2, 471.2, 468.2, 468.4, 468.8, 455, 468; 144/286 R; 29/434; 269/303, 31

[56] References Cited

U.S. PATENT DOCUMENTS

| | | | |
|---|---|---|---|
| 141,975 | 8/1973 | Xander | 83/435.1 |
| 790,182 | 5/1905 | Butterworth | 83/435.1 |
| 1,194,936 | 8/1916 | Bemis | 83/435.1 |
| 1,452,233 | 4/1923 | Zsuffa | 83/435.1 |
| 2,048,629 | 7/1936 | Wallin | 269/315 |
| 2,064,607 | 12/1936 | Hirtz, Sr. | 83/438 |
| 2,895,515 | 7/1959 | Ende | 83/467 |
| 4,111,409 | 9/1978 | Smith | 83/467 R |
| 4,161,900 | 7/1979 | Mendelsohn | 83/477.2 |

*Primary Examiner*—Frank T. Yost
*Assistant Examiner*—Scott A. Smith
*Attorney, Agent, or Firm*—Gerry A. Blodgett; Norman S. Blodgett

[57] ABSTRACT

A crosscut fixture for a table saw which includes a flat board, a guide rail which is fixed to the bottom surface of the board, and an elongated guide bar which is pivotally connected to the top surface of the board for enabling the guide bar to move relative to the board to a plurality of angular positions relative to the saw blade. The fixtures provided with a clamping device for locking the guide bar to the board at any desired angular setting. The guide bar is also provided with a length gauge and the board is provided with an angle scale which is intersected by the rear surface of the guide bar. The angular position of the guide bar relative to the saw blade is determined by aligning the lower edge of the rear surface of the guide bar at the appropriate angular marking on the scale. The guide bar is also provided with a length gauge at one end.

7 Claims, 2 Drawing Sheets

CROSSCUT FIXTURE FOR TABLE SAW

This is a continuation of co-pending application Ser. No. 064,311 filed on June 18, 1987 now abandoned.

BACKGROUND OF THE INVENTION

The present invention relates generally to a crosscut fixture for a table saw and, more specifically, to a crosscut fixture having miter and length gauges.

The conventional table saws are equipped with ripping and crosscut fixtures The crosscut fixture includes a push bar which is pivotally mounted on an elongated rail. The rail is adapted to fit into a corresponding elongated groove in the saw table. The groove is parallel with the plane of the saw blade so that the push bar is pushed toward the saw blade and is guided to one side of the blade along the groove. A workpiece which is to be cut is placed in front of the push bar so the point at which the workpiece is to be cut is in the plane of the saw blade. The workpiece is pushed into the saw blade by the push bar to cut off the workpiece. An angle or miter cut can be made on the workpiece by pivoting the push bar on the rail to the desired angle and locking the push bar in the selective position. The push bar is provided with an angle scale which is concentric with the pivot point of the push bar. The push bar has an indicating finger which moves along the scale as the bar is pivoted relative to the rail. The scale is difficult to read due to the relatively small size of the scale so that it is used only for obtaining a rough angle reading. Fine angular adjustments are made by running the workpiece through the saw and measuring the angle of the cut with a protractor or other angle measuring instrument. If the angle of the cut is not correct, the angle of the push bar is adjusted slightly in the direction of the desired angle. Usually, several trial and error cuts and adjustments must be made until the exact desired angle is reached. This procedure is tedious and time consuming and, therefore, inefficient. In some cases, the operator simply gives up trying to get the exact desired angle and proceeds with the best adjustment that can be obtained.

Other crosscut fixtures are provided with an adjustable length gauge. The length gauge is an adjustable stop which is mounted for longitudinal movement on the push bar and is engaged by the outer end of the workpiece. The stop is locked into position so that a plurality of identical workpieces can be cut. Length gauges are either slidably mounted on the push bar or are mounted on an elongated threaded rod. In the former case, the gauge can be adjusted quickly but it is very difficult to adjust accurately. The later length gauge can be adjusted accurately but adjustment is slow. These and other difficulties experienced with the prior art devices have been obviated by the present invention.

It is, therefore, a principle object of the invention to provide a crosscut fixture for a table saw which includes a miter gauge which can be adjusted quickly, easily, and accurately.

Another object of this invention is the provision of a crosscut fixture for a table saw which includes a miter gauge which can be adjusted with an accuracy which exceeds conventional protractors and other conventional angle measuring tools.

A further object of the present invention is the provision of a crosscut fixture which includes a cut-off gauge which can be adjusted quickly and accurately.

It is another object of the present invention to provide a crosscut fixture for a table saw having a length gauge and a miter gauge, each of which can be adjusted quickly and accurately.

A still further object of the invention is the provision of a crosscut fixture for a table saw which is inexpensive to manufacture and which is capable of a long life of useful service with a minimum of maintenance.

With these and other objects in view, as will be apparent to those skilled in the art, the invention resides in the combination of parts set forth in specification and covered by the claims appended hereto.

SUMMARY OF THE INVENTION

In general, the invention consists of a crosscut fixture for a table saw The fixture includes a planar supporting base which is mounted on the guide rail for sliding along the guide slot of a conventional saw table. An elongated guide bar is pivotally connected to the top surface of the supporting base so that the forward edge surface of the guide bar can assume a plurality of angular positions relative to the plane of the saw blade. Means are also provided for locking or clamping the guide bar relative to the supporting base at any desired angle relative to the plane of the saw blade. More specifically, the supporting base is provided with an angle gauge which is intersected by the forward edge surface of the guide bar for reading the angle of the guide bar on the scale. The guide bar is also provided with an adjustable length gauge which can be locked in any desired position, and a "memory block" which allows the length gauge to be moved to an inoperative position from a particular position and then reset to the same position.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
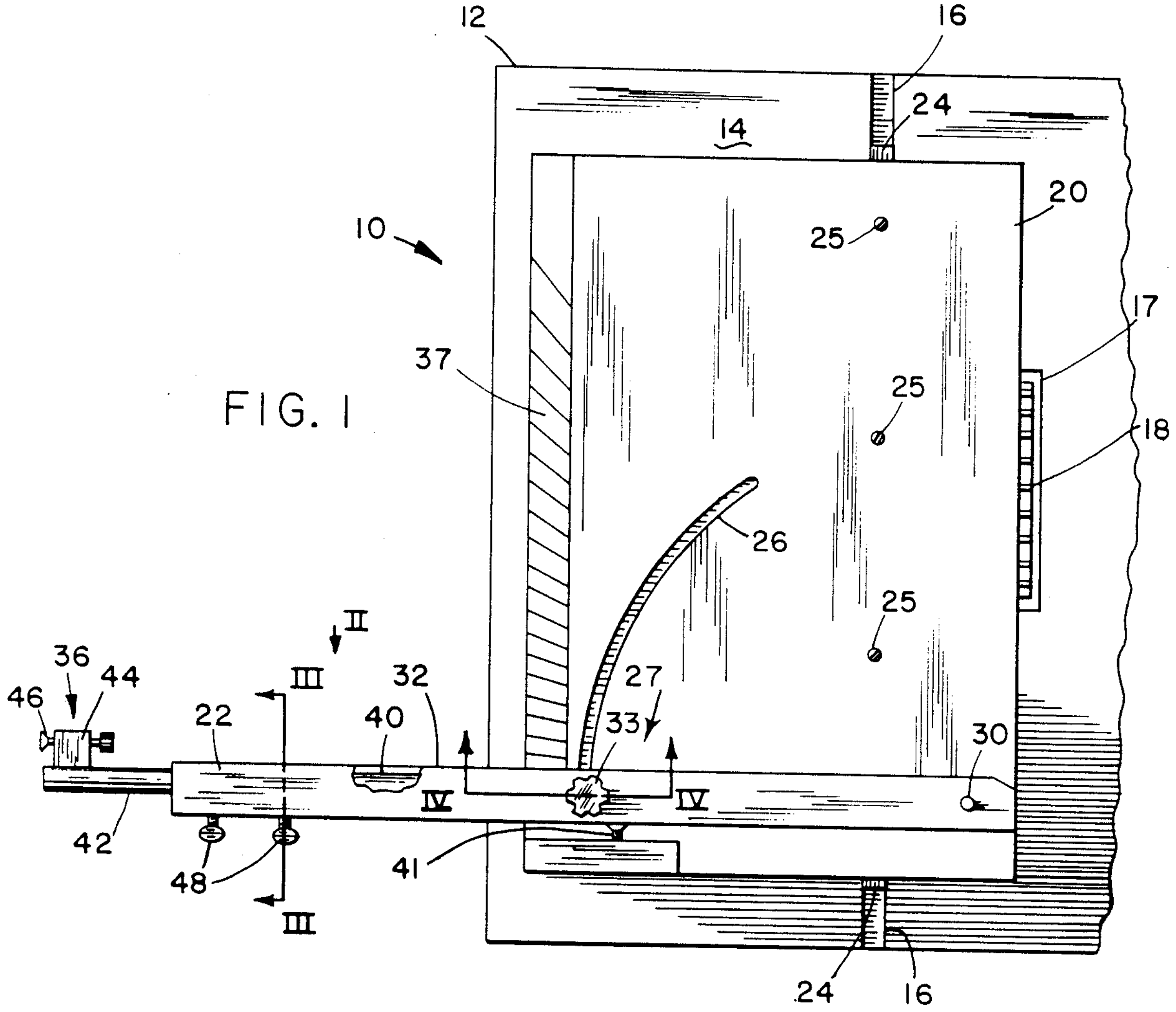
FIG. 1 is a top plan view of a crosscut fixture embodying the principles of the present invention.
Figure 2:
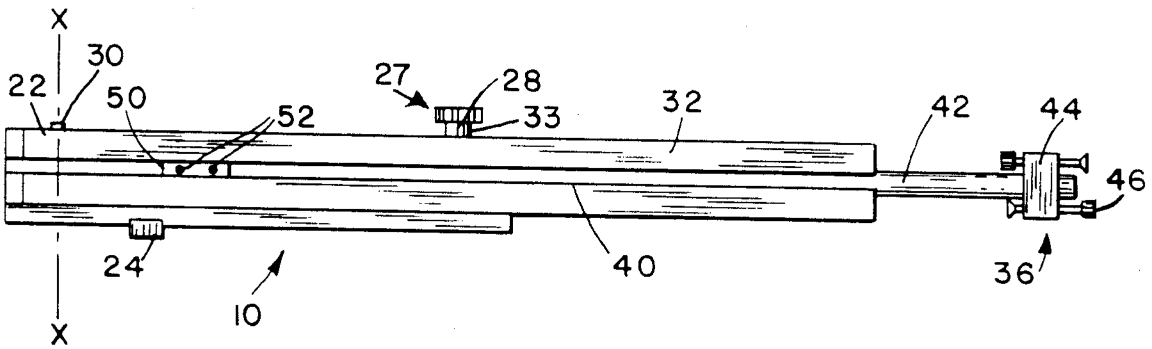
FIG. 2 is a rear elevational view of the crosscut fixture.

Referring first to FIGS. 1 and 2, the crosscut fixture of the present invention is generally indicated by the reference numeral 10 and is shown applied to a conventional table saw having a table 12 and a saw blade 18. The table 12 has an upper surface 14 which has an elongated rectangular guide groove 16 and a slot 17 which is parallel with the groove 16. The saw blade 18 extends upwardly through the slot 17.

Figure 4:
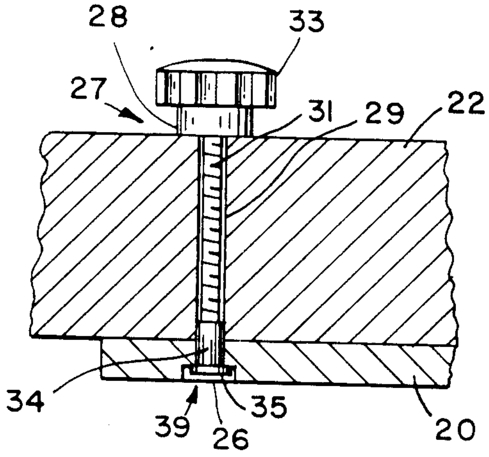
FIG. 4 is a fragmentary vertical cross-sectional view of the locking means for the guide bar.
Figure 5:
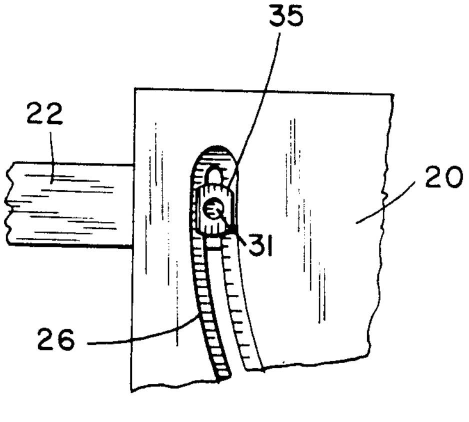
FIG. 5 is a fragmentary bottom plan view of a locking means for the guide bar.

The crosscut fixture 10 comprises a flat board or supporting base 20 and a guide bar 22 which is pivoted to the lower right-hand corner of the board 20 by means of a vertical pivot pin 30 which extends along the vertical axis X—X. An elongated rectangular guide bar 24 is fixed to the bottom of the board 20 by screws 25. The board 20 is provided with a radial slot 26 which extends about the axis X—X from the forward corner of the board which is furthest from the saw blade to the center of the board. Referring also to FIGS. 4 and 5, the slot 26 has an inverted T-shape in cross-section. The bottom of the slot 26 is substantially wider than the top of the slot.

The guide bar 22 can be moved to a plurality of angular positions relative to the plane of the saw blade 18 about the vertical axis X—X and can be locked in any selected angular position by locking means which is generally indicated by the reference numeral 27, see also FIGS. 4 and 5. The locking means 27 includes a bolt 28 having an elongated threaded portion 31 which extends freely through a vertical bore 29 in the guide bar 22 and a relatively large head portion 33. The head portion 33 has an indented annular vertical surface which enables the bolt 28 to be rotated quite easily by the users hand for locking and unlocking the guide bar in a selective angular position. The locking means 27 also includes a nut which is generally indicated by the reference numeral 39. The nut 39 includes a threaded tubular upper portion 34 and an enlarged head portion 35. The upper tubular portion 34 extends upwardly through the upper narrow portion of the slot 26 and the head portion 35 is located in the wider lower portion of the slot 26 as shown in FIG. 4. The shank portion 31 of the bolt 28 is threaded into the tubular portion 34 of the nut 39. The head portion 35 of the nut 39 is substantially horizontally wider than the upper narrow portion of the slot 26. One horizontal dimension of the head portion 35 is narrower than the lower portion of the slot 26. A second horizontal dimension of the head portion 35 is substantially wider than the lower portion of the slot 26, see FIG. 5. This enables the nut 39 to slide along the length of the slot 26 due to the smaller horizontal dimension of the head portion. However, the larger horizontal dimension of the head portion 35 prevents the nut 39 from rotating within the slot 26 about the vertical axis X—X. When the bolt 28 is rotated so that the shank 31 is advanced into the nut 39, the guide bar 22 and the board 20 are drawn together and clamped firmly in position. When it is desired to change the angle position of the guide bar 22 relative to the saw blade, the nut 28 is loosened and the guide bar is moved to its newly selected position.

The guide bar 22 has a vertical rear surface 32. The wood or workpiece which is to be cut is positioned on the top surface of the board 20 so that the forward edge of the workpiece rests against the rear surface 32 of the guide bar 22. An angle scale 37 is located on the top surface of the board 20 along the edge of the board which is furthest from the saw blade 18 (the left hand edge as viewed in FIG. 1). The scale 37 is vertically intersected by the rear surface 32 of the guide bar 22. The lower edge of the surface 32 rests directly on the scale and functions as a reference edge for reading angular positions of the guide bar directly on the scale. The scale is set so that when the guide bar 22 is at a right angle to the plane of the saw blade 18, the lower edge of the rear surface 32 rests on these area degree position of the scale. The scale 37 extends rearwardly from the guide bar 22 as shown in FIG. 1. indicia of the scale is in degrees of angular deviation from a right angle or 90° cut.

A preferred form of the invention comprises a board 20 in which the portion of the board between the guide rail 24 and the edge which is closest to the saw blade is slightly oversize. There is considerable variation in distance between the groove 16 and the blade 18 between different models of table saws. Because of this, the board 20 is constructed so that the edge of the board which is closest to the saw blade extends slightly beyond the saw blade of a table saw which has the greatest distance between the groove 16 and the saw blade. Preferably, the scale 37 is not applied to the top surface of the board 20 prior to purchase of the fixture. The operator applies the fixture 10 to his or her table saw and runs the board 20 through the saw to cut off the excess portion of the board. The guide bar 22 is then positioned so that the rear surface 32 is at a right angle to the saw blade and the edge of the board 20 which has been cut. A locating screw 41 is set so that it engages the forward surface of the guide bar 22 when the guide bar is at the right angular position with respect to this saw blade. The scale 37 is then applied to the top surface of the board 20 so that the rear surface 32 is vertically aligned with the zero degree position of the scale when the guide bar 22 is at the right angular position relative to the saw blade. The scale is preferably in the form of a flat plastic strip such as Mylar having a contact adhesive backing which is protected by a removable "peel-a-way" strip. The scale 37 is at a considerable distance from the pivoting axis of the guide bar 22. The angle guide graduations on the scale are considerably wide apart. There is a line for each degree. At the forward end of the scale, where the lines are closest together, the lines for each degree are approximately one-quarter inch apart. It is possible, therefore, to read even fractions of degrees. At the rear end of the scale, the lines for each degree are even further apart.

Figure 3:
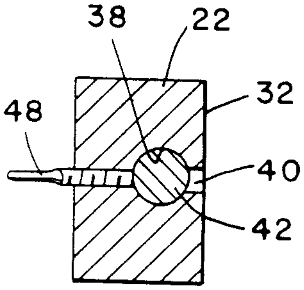
FIG. 3 is a vertical cross-sectional view of the guide bar portion of the fixture, taken along the line III—III of FIG. 2.

The end of the guide bar 22 which is furthest from the saw blade 18 extends beyond the board 20, to the left as viewed in FIG. 1. The outer end of the guide bar 22 is provided with an adjustable length gauge which is generally indicated by the reference numeral 36. A bore 38 extends along the length of the guide bar 22 and elongated slot 40 extends from the rear surface 32 to the bore 38, see particularly FIG. 3. An elongated rod 42 is slidably mounted within the bore 38 and is provided on one side with a stop block 44. A pair of adjusting screws 46 are threaded through the block 44 for fine adjustment. The elongated rod 42 is moved axially within the bore 38 to a desired setting and is then locked in place by a pair of thumb screws 48. This feature is particularly useful for cutting a plurality of identical pieces or pieces having the same length. At the beginning of a repetitive operation, the rod 42 is moved axially to obtain a rough setting. After the screws 48 are tightened to hold the rod 42 in position, the screws 46 are turned to provide a fine adjustment. Each piece which is to be cut off is placed along the rear surface 32 of the guide bar with one end abutting the screws 46. The entire fixture 36 is then moved along the groove 16 so that the workpiece which is to be cut off is advanced through the saw blade 18. If an extra long piece is to be cut off (a workpiece which exceeds the capacity of the gauge 36), the thumb screws 48 are loosened and a rod 42 is rotated 180 ° so that the block 44 faces forwardly and is out of the way of the workpiece which is to be cut. A short rod 50 is also located within the bore 38. The rod 50 is brought into abutment with the end of the rod 42 when the rod 42 is set for a particular length of cut. The rod 50 is then locked in place by a pair of screws 52 which extend all the way through the rod. The heads of the screws 52 can be accessed from the groove 40. When the screws are turned in one direction, they engage the back wall of the bore 38 and push the rod 50 forwardly against the front of the bore to clamp in place. This enables the rod 42 to be returned to its original setting if it has to be moved for any reason as, for example, moved out of the way position described above.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

We claim:

1. A method of adapting a crosscut fixture for a table saw which includes a flat horizontal top surface, an elongated slot in the top surface, a saw blade which extends through the slot and an elongated groove in the top surface which is parallel with the slot and the saw blade, said crosscut fixture having a planar supporting base having a horizontal bottom surface and horizontal top surface, an elongated guide rail which is fixed to the bottom surface of said base and which is adapted to ride in the groove of the top surface of said table saw for enabling said crosscut fixture to move along the top surface of said table saw relative to the saw blade and parallel with said slot, an elongated guide bar which is pivotally connected to the top surface of the supporting base for movement along said top surface, said guide bar having a central longitudinal axis, a longitudinal bottom edge and a longitudinal forward surfaces which is adapted to engage the longitudinal rear edge surface of a workpiece which is to be cut, locking means for releasably securing said guide bar to said supporting base so that said forward edge surface can selectively occupy a plurality of angular positions, said method comprising the following steps:

(a) positioning said planar supporting base on the top surface of said table saw to that the aid guide rail is located int eh groove of the table and the supporting base is rearward of the saw blade, (b) positioning said guide bar so that the longitudinal bottom edge of the guide base is at a right angle to the plane of the saw blade and said longitudinal bottom edge extends toward the edge of said planar supporting base which is furthest from said saw blade, (c) applying an angle scale to the horizontal top surface of said supporting base between the edge of said supporting base which is furthest from said saw and the pivoting point of the guide bar, said angle scale having a bottom surface and an upper surface which has graduated markings beginning from a zero angle marking, said scale being applied so that the longitudinal bottom edge of said guide bar intersects said zero angle marking when said longitudinal bottom edge is at a right angle to the plane of said saw blade, sand (d) fixing the bottom surface of said scale to the top surface of said supporting base.

2. A method as set forth in claim 1, wherein the bottom surface of said scale is fixed to the top surface of said supporting base by adhesive.

3. A crosscut fixture for a table saw which includes a flat horizontal top surface, an elongate slot in the tops surface, a saw blade which extends through the slot and an elongated groove in the top surface which is parallel with the slot and the saw blade, said crosscut fixture comprising:

(a) a planar supporting base having a horizontal bottom surface and a horizontal top surface, (b) an elongated guide rail which is fixed to the bottom surface of said base and which is adapted to ride in the groove of the top surface of said table for enabling said crosscut fixture to move along said groove relative to the saw blade and parallel with said slot, (c) an elongated guide bar which is pivotally connected to the top surface of the supporting base for movement along the top surface of said supporting base, said guide bar having a central longitudinal axis and a longitudinal forward surface which is adapted to engage the longitudinal rearward surface of a workpiece which is to be cut, said guide bar having a longitudinal bore which has a central longitudinal axis, (d) locking means for releasably securing said guide bar to said supporting base so that the forward surface of the guide bar can selectively occupy a plurality of angular positions relative to the plane of the saw blade, and (e) a length gauge comprising:

(1) a carrier which is mounted in said bore in telescoping fashion for axial sliding movement toward and away from said saw blade and longitudinally of the guide bar between an innermost position and an outermost position relative to said saw, said carrier being also mounted in said bore for rotation about the central axis of the bore between an active position and an inactive position, (2) means for clamping said carrier against said guide bar for any axial position of said carrier relative tot said guide bar, and (3) a work engaging element which is mounted on the carrier so that said work engaging element is in horizontal alignment with a workpiece which is placed against the forward surface of said guide bar when said carrier is in said active position for engaging the end of the workpiece which is furthest from said saw blade, said work engaging element being out of horizontal alignment with said workpiece when said carrier is in said inactive position.

4. A crosscut fixture for a table saw which includes a flat horizontal top surface, an elongated slot in the top surface, a saw blade which extends through the slot and an elongated groove in the top surface which is parallel with the slot and the saw blade, said crosscut fixture comprising:

(a) a planar supporting base having a horizontal bottom surface and a horizontal top surface, (b) an elongated guide rail which is fixed to the bottom surface of said base and which is adapted to ride in said groove for enabling said crosscut fixture to move along said groove relative tot eh saw blade and parallel with said slot, (c) an elongated guide bar which is pivotally connected to the top surface of the supporting base for movement along the top surface of said supporting base, said guide bar having a central longitudinal axis, a longitudinal bottom edge and a longitudinal forward surface which is adapted to engage the longitudinal rear surface of a workpiece which is to be cut, said guide bar having a longitudinal bore which has a central longitudinal axis and a longitudinal slot which extends into said bore, (d) locking means for securing said guide bar to said supporting base so that said rear surface can selectively occupy a plurality of angular positions relative tot eh plane of the saw blade, (e) a length gauge comprising:

(1) a carrier which is mounted in said bore in telescoping fashion for axial sliding movement toward and away from said saw blade and longitudinally of the guide bar between an inner most position and an outermost position relative to said saw, said carrier being also mounted in said bore for rotation about the central axis of the bore between an active position and an inactive position, said carrier having a free inner end, within said guide bar, (2) means for clamping said carrier against said guide bar for any axial position of said carrier relative to aid guide bar, and (3) a work engaging element which is mounted on the carrier so that said work engaging element is in horizontal alignment with a workpiece which is placed against the rear surface of said guide bar when said carrier is in said active position for engaging the end of the workpiece which is gustiest from said saw blade, said work engaging element being out of horizontal alignment with said workpiece when said carrier is in said inactive position, and (f) a memory fixture which comprises:

(1) a stop which is mounted on said carrier for sliding movement along said slot and which extends into said bore for being engaged by the free inner end of said carrier, and (2) means for clamping said stop at any point along said slot for limiting the inward movement of said carrier toward said saw.

5. A crosscut fixture for a table saw which includes a flat horizontal top surface an elongated slot in the top surface, a saw blade which extends through the slot and an elongated groove in the top surface which is parallel with the slot and the saw blade, said crosscut fixture comprising:

(a) a planar supporting base having a horizontal bottom surface and a horizontal top surface, (b) an elongated guide rail which is fixed to the bottom surface of said base and which is adapted to ride in said groove for enabling said crosscut fixture to move along said groove relative to the saw blade and parallel with said slot, (c) an elongated angle scale with graduated markings on said horizontal top surface, (d) an elongated guide bar which is pivotally connected to the top surface of the supporting base for movement along the top surface of said supporting base, said guide bar having a central longitudinal axis, a longitudinal bottom edge, and a longitudinal forward surface which is adapted to engage the longitudinal rearward surface of a workpiece which is to be cut, said guide bar having a latitudinal bore which has a central longitudinal axis, said longitudinal bottom edge functioning as a reference edge for reading the markings on said scale, and (e) locking means for releasably securing said guide bar to said supporting base so that said rear surface can selectively occupy a plurality of angular positions related to the plane of the saw blade, and a length gauge which is slidably mounted within the bore of said guide bar for movement toward and away from said saw blade when the longitudinal rearward surface of the workpiece is held against the longitudinal forward surface of the guide bar, said length gauge comprising:

(1) an elongated carrier which has a longitudinal axis and which is slidably mounted on said guide bar for movement along said axis linearly of said guide bar between an innermost position and an outermost position relative to said saw blade, (2) means for clamping said carrier against said guide bar at any point between said innermost position nd said outermost position, and (3) a stop which is mounted on said carrier so that the stop is spaced from said guide bar and is in horizontal alignment with a workpiece which is placed against the forward surface of said guide bar, said stop having a supporting element which is mounted on said carrier and fixed against linear movement relative to the carrier, and a work engaging element which is threaded into said supporting element and which has a thread axis which is parallel with the longitudinal axis of said carrier so that rotation of said work engaging element about said thread axis relative to said supporting element causes said work engaging element to move axially along said thread axis and parallel with said longitudinal axis, whereby a rough adjustment of the length gauge is obtained by moving the carrier along said longitudinal axis to an approximate setting and a fine adjustment is obtained by rotation of said work engaging element about said thread axis relative to said supporting element.

6. A crosscut fixture as recited in claim 5, wherein said reference edge is the rear bottom edge of said bottom surface.

7. A crosscut fixture as recited in claim 5, wherein said angle scale extends rearwardly of said guide bar when said guide bar is at a right angle from the plane of said saw blade.

* * * * *